United States Patent
Kim et al.

(10) Patent No.: US 7,889,805 B2
(45) Date of Patent: Feb. 15, 2011

(54) SMART ANTENNA SYSTEM AND METHOD THEREOF FOR FORMING UPLINK EIGENBEAM OF OFDM/TDD

(75) Inventors: Seong-Rag Kim, Daejeon (KR); In-Kyeong Choi, Daejeon (KR); Dong-Seung Kwon, Daejeon (KR); Seung-Ku Hwang, Seoul (KR)

(73) Assignees: Electronics and Telecommunications Research Institute (KR); Samsung Electronics Co., Ltd. (KR); KT Corporation (KR); SK Telecom Co., Ltd. (KR); KTFreetel Co., Ltd. (KR); Hanaro Telecom., Inc. (KR)

( * ) Notice: Subject to any disclaimer, the term of this patent is extended or adjusted under 35 U.S.C. 154(b) by 464 days.

(21) Appl. No.: 11/579,722

(22) PCT Filed: Nov. 10, 2004

(86) PCT No.: PCT/KR2004/002903
§ 371 (c)(1), (2), (4) Date: Oct. 7, 2008

(87) PCT Pub. No.: WO2005/109678
PCT Pub. Date: Nov. 17, 2005

(65) Prior Publication Data
US 2009/0067513 A1    Mar. 12, 2009

(30) Foreign Application Priority Data
May 6, 2004    (KR) ............... 10-2004-0031657

(51) Int. Cl.
*H04B 7/02* (2006.01)
(52) U.S. Cl. .............. 375/267; 375/260; 375/295; 375/316
(58) Field of Classification Search ......... 370/203–210; 375/260, 267, 316
See application file for complete search history.

(56) References Cited

U.S. PATENT DOCUMENTS

| | | | |
|---|---|---|---|
| 6,768,913 B1 * | 7/2004 | Molnar et al. | 455/562.1 |
| 7,020,110 B2 * | 3/2006 | Walton et al. | 370/334 |
| 7,113,548 B2 * | 9/2006 | Tanaka et al. | 375/267 |
| 7,573,946 B2 * | 8/2009 | Sandhu | 375/267 |
| 7,613,248 B2 * | 11/2009 | Ketchum et al. | 375/296 |
| 2002/0196734 A1 | 12/2002 | Tanaka et al. | |
| 2004/0042439 A1 * | 3/2004 | Menon et al. | 370/343 |

FOREIGN PATENT DOCUMENTS

| | | |
|---|---|---|
| JP | 2003-318853 | 11/2003 |
| WO | WO 97/00543 | 1/1997 |
| WO | WO 02/33852 | 4/2002 |

OTHER PUBLICATIONS

Huang et al., A Reduced Complexity Coded OFDM System with MIMO Antennas for Broadband Wireless Communications, Global Telecommunications Conference, Nov. 12, 2002, vol. 1, pp. 661-665.

* cited by examiner

*Primary Examiner*—Shuwang Liu
*Assistant Examiner*—Dhaval Patel
(74) *Attorney, Agent, or Firm*—The Farrell Law Firm, LLP

(57) ABSTRACT

A mobile station transmitting and receiving method and a corresponding mobile station transmitter and receiver of a smart antenna system for forming uplink eigenbeams of the OFDM/TDD (orthogonal frequency division multiplex/time division duplex), wherein OFDM symbols are received from a base station through a downlink via multiple antennas (250) and an FFT (fast Fourier transform) is performed on the received OFDM symbols by the FFT units (270). By means of a channel estimator (290) the channels are estimated and a beam weight generator (310) generates respective beam weights from the channels of the respective pilot tones of the respective subcarriers according to the channel estimation result. A beam weight multiplier (230) forms the uplink beam by multiplying the respective beam weights with the output of the signal repeater (220) and IFFT units (240) generate respective OFDM symbols which are transmitted via multiple antennas (250) through an uplink.

13 Claims, 4 Drawing Sheets

SMART ANTENNA SYSTEM AND METHOD THEREOF FOR FORMING UPLINK EIGENBEAM OF OFDM/TDD

TECHNICAL FIELD

The present invention relates to a smart antenna system and method thereof for forming uplink eigenbeams in an OFDM/TDD system. More specifically, the present invention relates to a smart antenna system and method thereof for forming OFDM/TDD-based uplink eigenbeams in an OFDM (orthogonal frequency division multiplex) system in which all subcarriers have spatial covariance and a TDD (time division duplex) system in which the subcarriers have reciprocity.

BACKGROUND ART

In order to perfectly realize a mobile communication system which allows transmission and receiving of all kinds of data with desired peers anytime and anywhere, the 3rd generation mobile communication systems which are operable by global and single standards and provide far better services than the present mobile communication system have been commercialized.

The next generation mobile communication system transmits and receives currently serviced speech signals, video, and other types of data with high reliability. Also, as various services are provided, the bandwidths of transmitted and received data will be wider, and demands of the mobile communication networks will be increased further.

Therefore, the most important technical aim of the next generation mobile communication systems is to propose techniques for transmitting further amounts of data with reliability by using as narrow bandwidths as possible.

However, since the reduction of useable bandwidths and the increase of reliability are incompatible, the conventional arts cannot solve the problems of capacity and reliability required by the next generation mobile communication.

Recently, a new technique for concurrently achieving the increases of capacity and reliability in the communication systems by controlling beam patterns of antennas and suppressing interference and noise has been aggressively studied. The so-called smart antenna technique has been highlighted as the core skill of the next generation mobile communication system.

The smart antenna technique allows a base station to establish an optimized beam to a mobile station subscriber, thereby reducing radio interference, increasing communication capacity, and improving communication quality.

For example, a smart antenna system installed in a base station adaptively processes respective speeds of 1) a fixed target such as an office, 2) a target which moves at a low speed such as a person or a satellite, and 3) a target which moves at a high speed such as a car or a train, and consecutively provides optimized beam patterns to thus provide maximum gains in the target directions, and provides relatively very much fewer gains in other directions to thus suppress the interference. That is, the above-noted smart antenna system increases capacity of the mobile communication system and improves communication reliability.

Therefore, the smart antenna characteristics provide a new technique applicable to the W-CDMA and CDMA2000 which are next generation communication methods for transmitting a huge volume of data with reliability.

Most studies for smart transmit antennas have been focused at the downlink category. In general, it is needed for a base station to know a temporal channel of a downlink in advance in order to apply a closed-loop downlink beam forming technique.

It is needed for the mobile station to feed temporal channel information back to the base station since frequency bandwidths of uplink and downlink channels are different in the FDD (frequency division duplex) mode. In this instance, a large amount of needed feedback information can be a problem for the closed-loop beam forming characteristics.

A conventional blind beam forming technique is a method for measuring an uplink channel and adaptively forming a downlink beam assuming that radio environments and spatial statistical properties of the uplink and the downlink are similar with each other. The blind beam forming technique requires no feedback information since it uses the channels' reciprocity, but loses diversity gain since a beam forming vector does not follow changes of the temporal channel.

Temporal channel information of the downlink must be fed back in order to obtain the spatial diversity gain, and since the amount of feedback information is increased as the number of transmit antennas is increased, and since the feedback rate is increased in order to track the changes of the temporal channel, it is very difficult to apply the above-described beam forming technique to the case in which a large number of transmit antennas are provided or a moving body moves fast. Many techniques for alleviating the above-noted problems have recently been proposed.

Korea Application No. 1999-43679 (filed on Oct. 9, 1999) discloses "Transmit antenna diversity controlling device and method in mobile communication system," and it relates to a control device and method for adaptively calculating weights in the closed-loop transmit antenna and performing transmit antenna diversity.

In detail, the above-described Korea Application consecutively tracks an optimized weight vector for a predetermined time frame, that is, detects a state of an initial downlink channel to find a weight vector, and finds a further accurate weight vector by using the found weight vector when detecting a state of a subsequent downlink channel, and hence, it applies variable weights to the respective antennas used for the transmit antenna diversity according to the channel states, and calculates the current weight by using the previous weight to thus perform adaptive weight calculation.

Korea Application No. 2000-11617 (filed on Mar. 8, 2000) discloses "Blind transmit antenna array device and method using feedback information in mobile communication system," and it aims to use at least two antenna elements and corresponding weight vectors and allow a base station to form appropriate transmission beans toward a specific mobile station, and to thereby increase subscriber capacity.

In detail, a base station proposed by the Korea Application No. 2000-11617 comprises a reverse processor for processing reverse signals received through an antenna array; a forward fading information extractor for extracting forward fading information from the received reverse signals; a bean forming controller for generating weight vectors for forming transmission beams by using the forward fading information and the received reverse signals; and a forward processor for forming a transmission message from the transmission beam according to the weight vector, and outputting the transmission message to the antenna array. Also, a mobile station comprises a forward processor for receiving forward signals and processing the sane; a forward fading estimator for estimating forward fading information for each path of the received forward signals; a forward fading encoder for combining the estimated forward fading information for each path to encode the sane; and a reverse processor for multiplexing the encoded forward fading information together with the transmission message, and feeding them back to the base station.

Therefore, the invention of the Korea Application No. 2000-11617 uses a mixed forward beam forming method for selecting from among a default (predictive) bean forming method and a blind forward beam forming method according to the moving speed of the mobile station when a feedback delay time is less or greater in a mobile communication system with multiple paths, and hence, the invention enables receiving the forward fading information from the mobile station and forming a further reliable transmission beam to thereby increase capacity and save transmission power of the mobile station.

A transaction entitled "Exploiting the short-term and long-term channel properties in space and time: Eigenbeam forming concepts for the BS in WCDMA" is disclosed in the European Trans. Telecomm. (pp. 365 to 378, 12th volume, 2001).

The transaction disclosed a temporal and spatial transmitter and receiver in the CDMA system with adaptive antennas applied to a base station according to eigenbeam forming concepts which reduces processing dimensions and finds a mean of a spatial covariance matrix in the downlink by using the long-term channel property, or obtains decorrelated diversity branches in the spatial and temporal manner by separating the spatial covariance matrix of a similar temporal tap in the uplink. US Application No. 2003-144032 (filed on Jul. 31, 2003) discloses "Beam forming method" which proposes a spatial and temporal transmitter and receiver in the CDMA system with an adaptive antenna applied to a base station according to the eigenbeam forming concepts.

In detail, the US Application removes the problems of the long-term eigenbeam formation and the short-term optimal combination which are properties of a rake receiver to thereby reduce calculation complexity, increases minimization of feedback for short-term processing since an eigenrake is adaptive to various radio environments when the number of antennas is increased, and obtains diversity gains and an interference alleviating effect by concurrently using the long-term and short-term properties of the channel.

The eigenbeam forming smart antenna technique proposed for the 3GPP (3rd generation partnership project) standard is realized by feeding back the information required for forming the downlink beans through the uplink, which will now be described.

First, the spatial channel property includes a long-term channel property and a short-term channel property. In this instance, the long-term channel property represents a spatial channel property which is varied in the long-term manner according to correlation between antenna elements, buildings and mountains, and locations of mobile stations, and the short-term channel property represents a spatial channel property which is quickly varied in the short manner depending on the Rayleigh fading.

In general, the short-term spatial covariance matrix $R_{ST}$ of the mobile station obtained by using an orthogonal pilot tone transmitted by the base station is given in Math FIG. 1.

$$R_{ST} = \sum_{n=1}^{N} h_n h_n^H$$ Math Figure 1 where $h_n$ is a channel vector of the $n^{th}$ temporal tap and is given as $h_n = (h_{n1}, h_{n2}, \ldots, h_{nL})^T$, and L is a number of transmit antennas.

Also, the long-term spatial covariance matrix $R_{LT}$ is given in Math FIG. 2.

$$R_{LT}(i) = \rho R_{LT}(i-1) + (1-\rho) R_{ST}(i)$$ MathFigure 2 where $\rho$ is a forgetting factor.

The long-term spatial covariance matrix $R_{LT}$ is given in Math FIG. 3 according to eigendecomposition.

$$R_{LT} V = V \Theta$$ MathFigure 3 where $$\Theta = \mathrm{diag}(\lambda_1, \lambda_2, \ldots, \lambda_L)$$

is a diagonal matrix with eigenvalues of $$\lambda_1 \geq \lambda_2 \geq \ldots \geq \lambda_L$$

as elements, and $$V = [V_1 V_2 \ldots V_L]$$

where $v_L$ is an eigenvector corresponding to $\lambda_L$.

Also, in order to quickly reduce a lesser amount of feedback or computational complexity, eigenvectors which correspond to $N_f$ large eigenvalues from among L eigen values are defined to be eigenbeams or eigenmodes. The eigenbeam for maximizing a receive power $$P_m = \sum_{n=1}^{N} |v_m^H h_n|^2 = v_m^H R_{ST}^T v_m$$

of the mobile station is selected from among the eigenbeams.

In the 3GPP WCDMA system, the eigenbeams are transmitted per bit for each frame to the base station from the mobile station according to the feedback speed of 1,500 bps through the DPCCH (dedicated physical control channel), and when two eigenmodes are provided, it is determined to select one of the two eigenmodes for each slot, and a corresponding result is transmitted to the base station from the mobile station.

However, since the OFDM method has different bean forming vectors for the respective subcarriers in the case of using the 3GPP method, feedback information is substantially increased, and it is impossible to realize the effective communication system.

DISCLOSURE OF INVENTION

Technical Problem

It is an advantage of the present invention to provide a smart antenna system and method thereof for forming OFDM/TDD-based uplink eigenbeams for reducing complexity of a communication system by using the fact that the subcarriers of the OFDM system have the sane spatial covariance and the TDD system has channel reciprocity.

It is another advantage of the present invention to provide a smart antenna system and method thereof for forming OFDM/TDD-based uplink eigenbeams without using a conventional feedback device by using per-subcarrier spatial covariance matrix selectors and quickly finding an uplink spatial covariance in the downlink in the OFDM/TDD system.

Technical Solution

In one aspect of the present invention, a mobile station transmitter and receiver of a smart antenna system for forming uplink eigenbeams of the OFDM/TDD (orthogonal frequency division multiplex/time division duplex) comprises: multiple antennas for transmitting OFDM symbols to a base station receiver, and receiving OFDM symbols from a base station transmitter; a mobile station receiver for performing FFT (fast Fourier transform) on the OFDM symbols which are received by a predetermined number through the multiple antennas, outputting FFT-performed symbols as parallel signals, estimating a channel from the parallel signals, detecting symbols from the parallel signals and converting the detected symbols into serial signals by using channel estimation results, and outputting decoded signals; and a mobile station transmitter for converting channel-coded symbols which are input in series into a pre-determined number of parallel signals, generating respective bean weights from the channels of the respective pilot tones of the subcarriers according to the channel estimation results executed by the mobile station receiver, generating respective OFDM symbols with formed eigenbeams, and outputting them.

The mobile station transmitter comprises: a S/P (serial/parallel) converter for converting the channel-coded symbols which are input in series into a predetermined number of parallel signals; a signal repeater for repeating the parallel signals by the number of the multiple antennas; a bean weight generator for generating an eigenbeam weight from per-pilot channels of each subcarrier according to a channel estimation result; a bean weight multiplier for respectively multiplying the bean weight generated by the beam weight generator by the output of the signal repeater, and outputting results; and a plurality of IFFT (inverse fast Fourier transform) units for receiving the predetermined number of parallel signals, generating each OFDM symbol, and outputting the OFDM symbol.

The bean weight generator comprises: a per-pilot spatial covariance matrix generator for receiving per-pilot channel matrices according to the channel estimation result, and generating per-pilot spatial covariance matrices of the respective subcarriers; a per-subcarrier spatial covariance mnatrix generator for using a pre-determined number of pilot tones provided in a subcarrier, receiving the per-pilot spatial covariance matrices, and generating respective per-subcarrier spatial covariance matrices; a short-term spatial covariance matrix generator for using a property that a predetermined number of downlink subcarriers provided to one user have the sane spatial covariance matrix, receiving the respective per-subcarrier spatial covariance matrices, and generating short-term spatial covariance matrices; a long-term spatial covariance matrix generator for receiving the short-term spatial covariance matrices, and outputting long-term spatial covariance matrices; a per-subcarrier spatial covariance matrix selector for selecting a spatial covariance matrix of the subcarriers allocated to the uplink of the per-subcarrier spatial covariance matrix selector from the per-subcarrier spatial covariance matrices; an eigen divider for receiving the long-term spatial covariance matrices, dividing them into respective eigenbeams, and outputting the eigenbeams; and a beam weight selector for receiving the divided eigenbeams and the uplink per-subcarrier spatial covariance matrices, and outputting respective per-subcarrier beam weights.

The short-term spatial covariance matrices correspond to the long-term spatial covariance matrices when a received packet is short.

The eigenbeam of the eigen divider is defined to be an eigenvector which corresponds to the largest eigenvalue from among a predetermined number of eigenvectors, and is divided by the eigenbeam which maximizes the received power of the mobile station from among a plurality of eigenbeams.

The mobile station receiver comprises: a plurality of FFT units for receiving the respective OFDM symbols through the multiple antennas, performing FFT on the OFDM symbols by the number of the multiple antennas, and outputting parallel signals; a channel estimator for estimating channels from the parallel signals; a signal detector for using results of the channel estimator, detecting symbols from the parallel signals, and outputting a predetermined number of detected parallel signals; a P/S converter for converting the detected parallel signals into serial signals; and a channel decoder for decoding the serial signals, and outputting decoded signals.

The channel estimator outputs channel matrices of the respective pilots for the respective subcarriers in order to calculate beamforming weights.

In another aspect of the present invention, a base station transmitter and receiver of a smart antenna system for forming uplink eigenbeams of the OFDM/TDD comprises: multiple antennas for receiving respective OFDM symbols from a mobile station transmitter, and transmitting OFDM symbols to a mobile station receiver; a base station receiver for receiving the OFDM symbols with respective formed eigenbeams from the mobile station transmitter, performing FFT on them, outputting FFT-performed OFDM symbols as parallel signals, detecting symbols from the parallel signals, converting the detected symbols into serial signals, and outputting decoded signals; and a base station transmitter for converting channel-coded symbols which are input in series into a predetermined number of parallel signals, repeating N parallel signals by the number of multiple antennas to which the N parallel signals are input, generating respective OFDM symbols, and outputting the OFDM symbols, the N parallel signals being obtained by multiplexing user signals.

The base station receiver comprises: a plurality of FFT units for receiving the OFDM symbols through the multiple antennas, performing FFT on them by the number of the multiple antennas, and outputting FFT-performed symbols as parallel signals; a signal detector for detecting symbols from the parallel signals, and outputting a predetermined number of detected parallel signals; a P/S converter for converting the detected parallel signals into serial signals, and outputting the serial signals; and a channel decoder for decoding the serial signals, and outputting the serial signals.

The channel decoder corrects random errors when the moving speed of the mobile station is fast such that an inaccurate optimized eigenbeam is selected.

The base station transmitter comprises: S/P converters for converting channel-coded symbols which are input in series into a predetermined number of parallel signals; a signal repeater for repeating N parallel signals by the number of antennas when user signals are multiplexed to be input as the N parallel signals; and a plurality of IFFT units for receiving the N parallel signals, and generating each OFDM symbol.

In still another aspect of the present invention, a mobile station transmitting and receiving method of a smart antenna system for forming uplink eigenbeams of the OFDM/TDD comprises: (a) receiving respective OFDM symbols from a base station transmitter through a downlink; (b) performing FFT on the received OFDM symbols, outputting FFT-performed OFDM symbols as parallel signals, and estimating channels from the parallel signals; (c) converting channel-coded symbols which are input in series into a predetermined number of parallel signals; (d) generating respective beam weights from the channels of the respective pilot tones of the respective subcarriers according to a channel estimation result; and (e) forming eigenbeams according to the respective bean weights, generating respective OFDM symbols, and transmitting the OFDM symbols to the base station receiver through the uplink.

The step (b) comprises: (i) receiving per-pilot channel matrices according to the channel estimation result, and generating per-pilot spatial covariance matrices of respective subcarriers; (ii) using a predetermined number of pilot tones provided on a subcarrier, receiving the per-pilot spatial covariance matrices, and generating respective per-subcarrier spatial covariance matrices; (iii) using a property that a predetermined number of downlink subcarriers have the same spatial covariance matrix, receiving the respective per-subcarrier spatial covariance matrices, and generating short-term spatial covariance matrices; (iv) receiving the short-term spatial covariance matrices and outputting long-term spatial covariance matrices; (v) selecting spatial covariance matrices of subcarriers allocated to the uplink from among the per-subcarrier spatial covariance matrices; (vi) receiving the long-term spatial covariance matrices, dividing them into respective eigenbeams, and outputting the eigenbeams; and (vii) receiving the divided eigenbeams and the uplink per-subcarrier spatial covariance matrices, and outputting beam weights for the respective subcarriers.

The step (i) comprises: using the equation of $$R_{\tilde{H}_k}(n_k) = \tilde{H}_k^H(n_k)\tilde{H}_k(n_k)$$

and finding per-pilot spatial covariance matrices of respective subcarriers where $$R_{\tilde{H}_k}(n_k)$$

is the temporal spatial covariance matrix of the uplink MIMO channel matrix of $$\tilde{H}_k(n_k)$$

defined by using the $n_k$-th pilot of the subcarrier k.

The step (ii) comprises: using $N_k$ pilots provided on a subcarrier and finding the spatial covariance matrix of the subcarrier k defined by the equation of $$R_{\tilde{H}_k} = \frac{1}{N_k}\sum_{n_k=1}^{N_k} R_{\tilde{H}_k}(n_k).$$

The step (iii) comprises: finding the short-term spatial covariance matrix $R_{ST}$ by using the equation of $$R_{ST} = \frac{1}{N}\sum_{k=1}^{N} R_{\tilde{H}_k}$$

since the downlink subcarriers provided to one user have the same spatial covariance matrix.

The step (iv) comprises: finding the long-term spatial covariance matrix $R_{LT}$ by using the equation of $$R_{LT}(i) = \rho R_{LT}(i-1) + (1-\rho) R_{ST}(i)$$

where i is a number of frames and p is a forgetting factor.

The step (vi) comprises: performing eigen division by using the equation of $$R_{LT}V = V\Theta$$

where $$\Theta = \text{diag}(\lambda_1, \lambda_2, \ldots, \lambda_L)$$

is a diagonal matrix having the eigenvalues of $$\lambda_1 \geq \lambda_2 \geq \ldots \geq \lambda_L$$

as elements, and it is given that $$V = [v_1 v_2 \ldots v_L]$$

where $V_L$ is an eigenvector corresponding to $\lambda_L$.

The step (vii) comprises: using the subsequent equation and outputting beam weights for the respective subcarriers so that the eigenbeam for maximizing the received power of the base station of the subcarrier c may be the optimal bean of the u-th subcarrier from among U uplinks when the u-th subcarrier from among the U uplinks allocated to one user substantially corresponds to N subcarriers c, the equation being given as:

$$w_{u\_U} = \arg\max_{v_n, n=1,2,\ldots,L} \|\tilde{H}_c v_n\|^2$$
$$= \arg\max_{v_n, n=1,2,\ldots,L} v_n^H R_{\tilde{H}_c} v_n.$$

In still yet another aspect of the present invention, a base station transmitting and receiving method of a smart antenna system for forming uplink eigenbeams of the OFDM/TDD comprises: (a) receiving respective OFDM symbols with eigenbeams transmitted from a mobile station transmitter; (b) performing FFT on the OFDM symbols, and outputting them as parallel signals; (c) detecting symbols from the parallel signals, converting the symbols into serial signals, and outputting decoded signals; (d) converting channel-coded symbols which are input in series into a pre-determined number of parallel signals; (e) repeating N parallel signals by the number of base station antennas to which the N parallel signals are input, and generating respective OFDM symbols, the N parallel signals being obtained by multiplexing user signals; and (f) respectively transmitting the OFDM symbols to a mobile station receiver.

The step (c) further comprises: correcting randy errors when the moving speed of the mobile station is fast such that an inaccurate optimized eigenbeam is selected.

Advantageous Effects

According to the present invention, a fed-back state of information for beamforming through a downlink is eliminated by using properties that subcarriers of the OFDM/TDD system have the same spatial covariance and the TDD system has channel reciprocity, and system complexity is reduced by finding a spatial covariance matrix for forming eigenbeams through pilots of downlink subcarriers.

BRIEF DESCRIPTION OF THE DRAWINGS

The accompanying drawings, which are incorporated in and constitute a part of the specification, illustrate an embodiment of the invention, and, together with the description, serve to explain the principles of the invention.

BEST MODE FOR CARRYING OUT THE INVENTION

Figure 1:
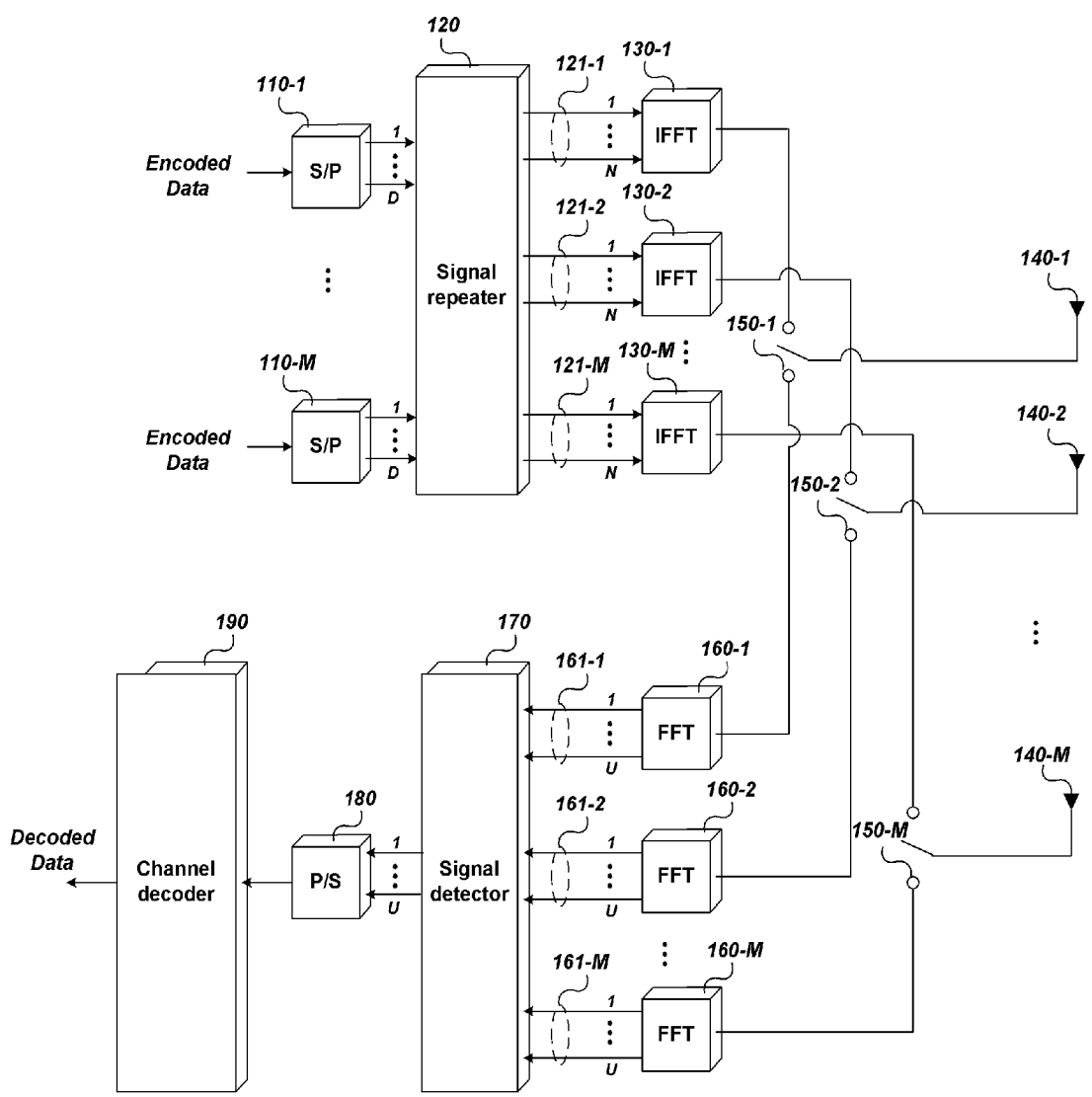
FIG. 1 shows a block diagram of a base station of an OFDM/TDD-based smart antenna system according to a preferred embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

A smart antenna system and method thereof for forming OFDM/TDD-based uplink eigenbeams according to a preferred embodiment of the present invention will be described with reference to drawings.

L mobile station antennas, M base station antennas, and N valid subcarriers will be considered in the OFDM/TDD system according to the preferred embodiment of the present invention. In general, a downlink subcarrier group allocated to one user and an uplink subcarrier group allocated thereto are different in the OFDM (or OFDMA) system.

When it is assumed that D downlink subcarriers are allocated to one user, the respective subcarriers are provided with constant intervals therebetween in order to use frequency diversity, and are not consecutive. Also, the subcarriers of the user and the subcarriers allocated to other users are provided to the mobile station in the downlink, and hence, a total of N subcarriers are provided to the mobile station. Also, it is assumed in the uplink that U subcarriers are allocated to one user.

Further, a MIMO (multi input multi output) channel between a mobile station antenna l of the kth subcarrier and a base station antenna m is defined below in the smart antenna system according to the preferred embodiment of the present invention.

$$\tilde{H}_k = \begin{bmatrix} \tilde{h}_{k,1,1} & \tilde{h}_{k,1,2} & \cdots & \tilde{h}_{k,1,L} \\ \tilde{h}_{k,2,1} & \tilde{h}_{k,2,2} & \cdots & \tilde{h}_{k,2,L} \\ \vdots & \vdots & \ddots & \vdots \\ \tilde{h}_{k,M,1} & \tilde{h}_{k,M,2} & \cdots & \tilde{h}_{k,M,L} \end{bmatrix} \quad \text{MathFigure 4}$$

where $\tilde{h}_{k,m,l}$ is a frequency domain channel response of between the mobile station antenna l and the base station antenna m of the subcarrier k.

Therefore, when a CIR (channel impulse response) with P multi-paths between the mobile station antenna l and the base station antenna m is defined to be $\{h_{p,m,l}\}$ p=0,1, ... P-1, m=1, ..., M, l=1, ..., L, the frequency domain channel response $\tilde{h}_{k,m,l}$ is given in Math FIG. 5.

$$\tilde{h}_{k,m,l} = \sum_{p=0}^{P-1} h_{p,m,l} e^{-j2\pi pk/K} \quad \text{MathFigure 5}$$

Math FIG. 6 is given when assuming that no correlation is provided between other paths in the channel of $h_{p,m,l}$.

$$E[H_p{}^H H_{p'}] = \sigma_{h,p}^2 R_{H_p} \delta_{p,p'} \quad \text{MathFigure 6}$$

where $\sigma^2_{h,p}$ is a power delay profile of the CIR.
This is satisfied as Math FIG. 7.

$$[R_{H_p}]_{s,t} = \frac{1}{\sigma_{h,p}^2} E[h^*_{p,m,s} h_{p,m,t}], \quad s, t = 1, 2, \ldots L \quad \text{MathFigure 7}$$

The spatial covariance matrix of the channel $\tilde{H}_k$ is defined in Math FIG. 8.

$$R_{\tilde{H}_k} = E[\tilde{H}_k{}^H \tilde{H}_k] \quad \text{MathFigure 8}$$

Accordingly, the spatial covariance matrix $R_{\tilde{H}_k}$ of the channel matrix $\tilde{H}_k$ of each subcarrier is given in Math FIG. 9.

$$\begin{aligned}[R_{\tilde{H}_k}]_{s,t} &= \sum_{m=1}^{M} E[\tilde{h}^*_{k,m,s} \tilde{h}_{k,m,t}], \quad s, t = 1, 2, \ldots L \\ &= \sum_{m=1}^{M} E\left[\left(\sum_{p=0}^{P-1} h_{p,m,s} e^{-j2\pi pk/N}\right)^* \left(\sum_{p'=0}^{P-1} h_{p',m,t} e^{-j2\pi p'k/N}\right)\right] \\ &= \sum_{m=1}^{M} \sum_{p=0}^{P-1} E[h^*_{p,m,s} h_{p,m,t}] \\ &= \sum_{p=0}^{P-1} \sigma_{h,p}^2 [R_{H_p}]_{s,t} \\ &= R_{\tilde{H}}\end{aligned} \quad \text{MathFigure 9}$$

-continued $$\stackrel{\Delta}{=} \left[\sum_{p=0}^{P-1} \sigma_{h,p}^2 R_{H_p}\right]_{s,t}$$

It is shown from Math FIG. 9 that the spatial covariance matrix $R_{H_k}$ is not a function of the random subcarrier k. In detail, since each subcarrier of the OFDM system undergoes different frequency selective fading, each subcarrier has a different channel property, but the spatial covariance matrix is the same for the subcarriers.

As a result, since the spatial covariance matrix is the same for the subcarriers, an accurate estimate is found by averaging the subcarriers.

In the smart antenna system according to the preferred embodiment, the uplink MIMO channel matrix defined in Math FIG. 10 is found by using the $n_k$th pilot symbols (e.g., a preamble and a midamble) of the subcarrier k.

$$\tilde{H}_k(n_k) = \begin{bmatrix} \tilde{h}_{k,1,1}(n_k) & \tilde{h}_{k,1,2}(n_k) & \ldots & \tilde{h}_{k,1,L}(n_k) \\ \tilde{h}_{k,2,1}(n_k) & \tilde{h}_{k,2,2}(n_k) & \ldots & \tilde{h}_{k,2,L}(n_k) \\ \vdots & \vdots & \ddots & \vdots \\ \tilde{h}_{k,M,1}(n_k) & \tilde{h}_{k,M,2}(n_k) & \ldots & \tilde{h}_{k,M,L}(n_k) \end{bmatrix} \quad \text{MathFigure 10}$$

Also, $R_{\tilde{H}_k}(n_k)$ is a temporal spatial covariance matrix of $\tilde{H}_k(n_k)$ , defined in Math FIG. 11.

$$R_{\tilde{H}_k}(n_k) = \tilde{H}_k^H(n_k)\tilde{H}_k(n_k) \quad \text{MathFigure 11}$$

Also, the spatial covariance matrix of the subcarrier k is found by using $N_k$ pilots provided in one subcarrier, as given in Math FIG. 12.

$$R_{\tilde{H}_k} = \frac{1}{N_k} \sum_{n_k=1}^{N_k} R_{\tilde{H}_k}(n_k) \quad \text{MathFigure 12}$$

Further, as described above, the short-term spatial covariance matrix $R_{ST}$ as given in Math FIG. 13 is found since the N downlink subcarriers provided to one user have the same spatial covariance matrix.

$$R_{ST} = \frac{1}{N} \sum_{k=1}^{N} R_{\tilde{H}_k} \quad \text{MathFigure 13}$$

The long-term spatial covariance matrix $R_{LT}$ is given in Math FIG. 14 in a like manner of the 3GPP WCDMA system.

$$R_{LT}(i) = \rho R_{LT}(i-1) + (1-\rho) R_{ST}(i) \quad \text{MathFigure 14}$$

where i is a number of frames, and $R_{ST}(i)$ is a short-term spatial covariance matrix found at the $i^{th}$ frame. When the length of the packet is very short, $\rho$ can be established to be 0 and as a result, it is given that $R_{LT}(i)=R_{ST}(i)$.

Further, the eigenmode is obtained by performing eigendivision as given in Math FIG. 15.

$$R_{LT}V = V\Theta \quad \text{MathFigure 15}$$

where $\Theta = \text{diag}(\lambda_1, \lambda_2, \ldots, \lambda_L)$ is a diagonal matrix having the eigenvalues of $\lambda_1 \geq \lambda_2 \geq \ldots \geq \lambda_L$ as elements, and it is given that $V = [v_1 v_2 \ldots v_L]$ where $V_L$ is an eigenvector corresponding to $\lambda_L$. Here, the L eigenvectors can be defined with the eigenmodes since no feedback is provided differing from the 3GPP standard.

When the u-th subcarrier from among U uplinks allocated to one user substantially corresponds to N subcarriers of c, the eigenbeam for maximizing the received power of a base station of the subcarrier of c becomes the optimal bean of the u-th subcarrier from among the U uplinks.

$$w_{u\_U} = \arg\max_{v_n, n=1,2,\ldots,L} \|\tilde{H}_c v_n\|^2 \quad \text{MathFigure 16}$$
$$= \arg\max_{v_n, n=1,2,\ldots,L} v_n^H R_{\tilde{H}_c} v_n$$

The optimal uplink beam found in the downlink frame of i is applicable to the uplink of the frame of i.

Also, a wrong eigenbeam can be selected when a less coherent time is provided, and the error caused by selection of a wrong eigenbeam has randomness, and the randomness is corrected by a channel decoder.

A smart antenna system according to the preferred embodiment of the present invention will now be described in detail with reference to the above-described principle of the present invention.

Figure 2:
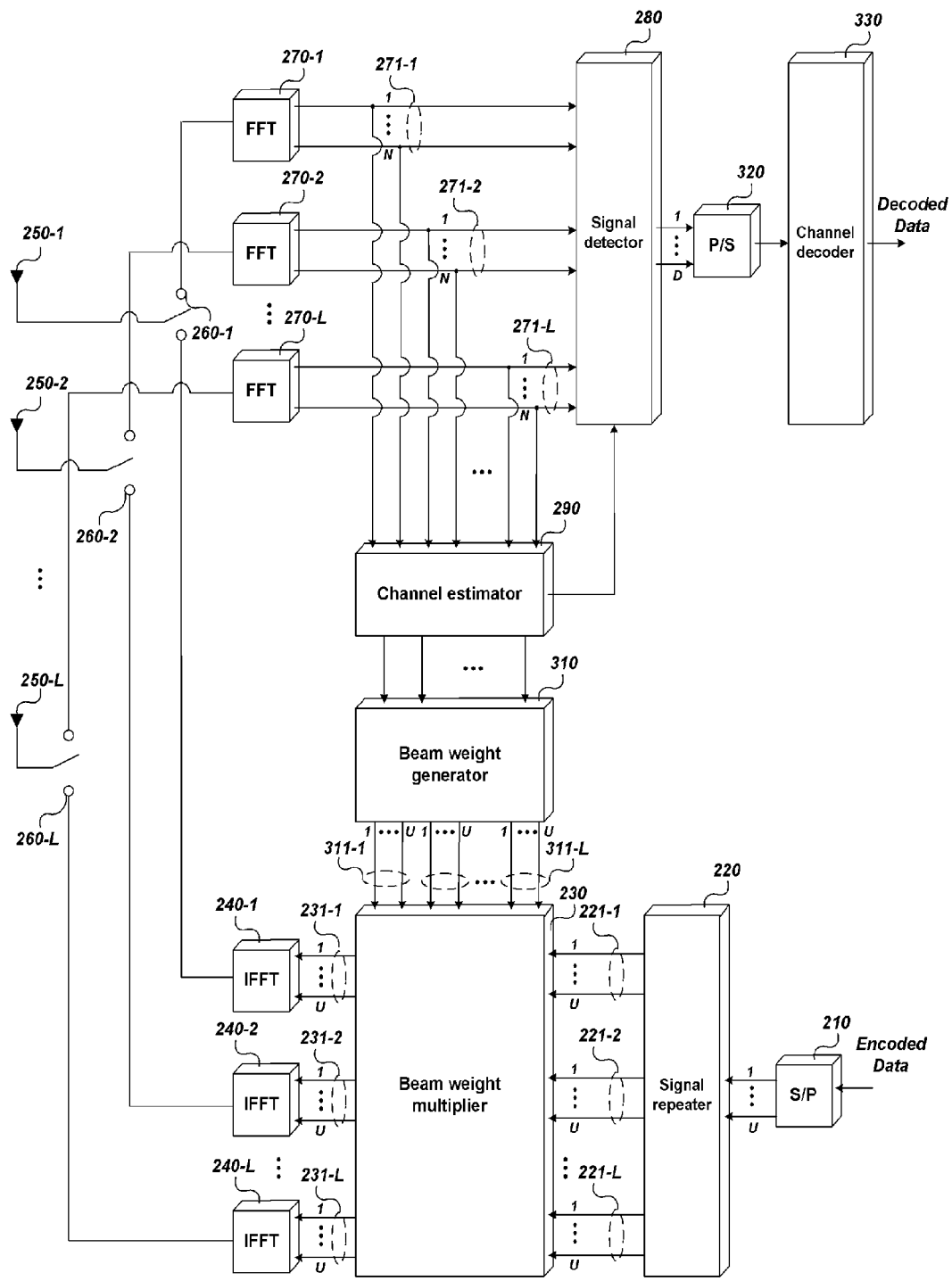
FIG. 2 shows a block diagram of a mobile station of an OFDM/TDD-based smart antenna system according to a preferred embodiment of the present invention.

FIG. 1 shows a block diagram of a base station of an OFDM/TDD-based smart antenna system according to a preferred embodiment of the present invention, and FIG. 2 shows a block diagram of a mn)bile station of an OFDM/TDD-based smart antenna system according to a preferred embodiment of the present invention.

The base station of the OFDM/TDD-based smart antenna system includes M antennas 140-1 to 140-M, the mn)bile station includes L antennas 250-1 to 250-L, and the base station and the mn)bile station include a transmitter and a receiver respectively.

Referring to FIG. 1, the transmitter of the base station comprises S/P (serial to parallel) converters 110-1 to 110-M, a signal repeater 120 and M IFFT (inverse fast Fourier transform) units 130-1 to 130-M (where M corresponds to the number of transmit antennas). The receiver of the base station comprises M FFT (fast Fourier transform) units 160-1 to 160-M (where M corresponds to the number of receive antennas), a signal detector 170 a P/S (parallel to serial) converter 180 and a channel decoder 190. The base station antennas 140-1 to 140-M are accessed through respective switches 150-1 to 150-M to the transmitter of the base station in the case of downlink communication, and to the receiver of the base station in the case of uplink communication.

Referring to FIG. 2, the transmitter of the mobile station comprises an S/P converter 210, a signal repeater 220, a bean weight multiplier 230, and L IFFT units 240-1 to 240-L (L corresponds to the number of antennas), and the receiver thereof comprises L FFT units 270-1 to 270-L (L corresponds to the number of mobile station antennas), a channel estimator 290, a signal detector 280, a P/S converter 320, and a channel decoder 330. Further, the mobile station antennas 250-1 to 250-L are accessed through respective antenna switches 260-1 to 260-L to the receiver of the mobile station in the case of downlink communication, and to the transmitter of the mobile station in the case of uplink communication.

Referring to FIG. 1 again, the S/P converters 110-1 to 110-M of the transmitter of the base station convert channel-coded symbols into D parallel signals.

When it is assumed in this instance that signals of many users are multiplexed and N parallel signals are input, the signal repeater 120 repeats the multiplexed N parallel signals by as many as the number of the base station antennas M. The respective IFFT units 130-1 to 130-M receive the N parallel signals and generate a single OFDM symbol.

OFDM symbols 121-1 to 121-M output by the signal repeater 120 are passed through the respective IFFT units 130-1 to 130-M and transmitted through the mobile station antennas 140-1 to 140-M.

The OFDM symbols 121-1 to 121-M are received through the L mobile station antennas 250-1 to 250-L shown in FIG. 2, and the L FFT units 270-1 to 270-L output parallel signals 271-1 to 271-M.

The FFT-performed signals are input to the channel estimator 290 and the signal detector 280 and the signal detector 283 uses results of the channel estimator 290 to output D detected signals.

The P/S converter 320 processes the detected signals to output serial signals, and the channel decoder 330 processes the serial signals and outputs decoded data. The channel estimator 290 outputs a channel matrix for each pilot tone of the subcarrier in order to calculate a bean forming weight. For example, the channel estimator 290 finds a channel matrix of $$\tilde{H}_k(n_k)$$

of Math FIG. 10 from the $n_k$-th pilot of the subcarrier k.

Figure 3:
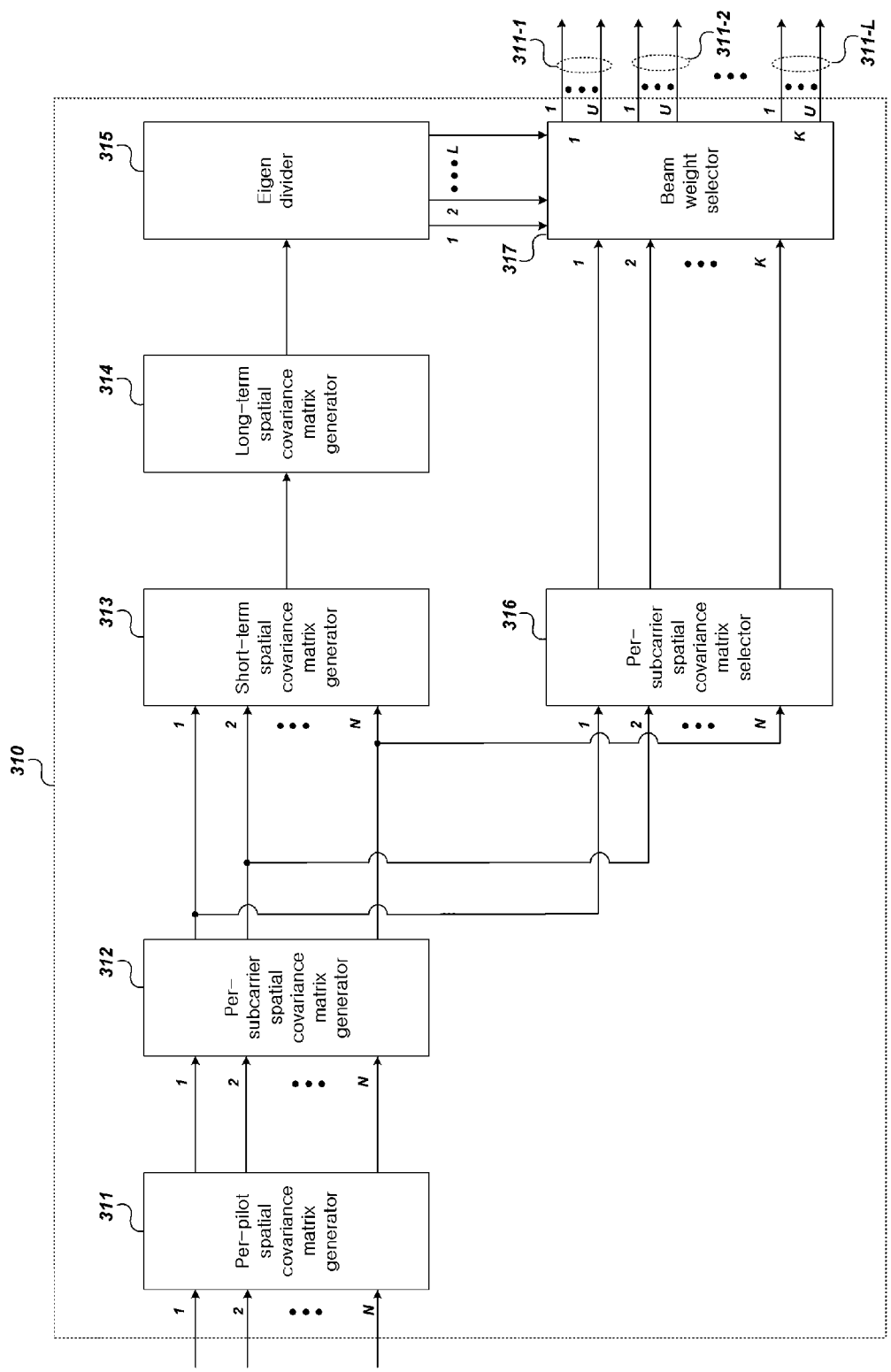
FIG. 3 shows a block diagram of a bean weight generator of a mobile station in an OFDM/TDD-based smart antenna system according to a preferred embodiment of the present invention.

FIG. 3 shows a block diagram of a beam weight generator 310 of a mobile station in an OFDM/TDD-based smart antenna system according to a preferred embodiment of the present invention.

Referring to FIG. 3, the beam weight generator 310 comprises a per-pilot spatial covariance matrix generator 311, a per-subcarrier spatial covariance matrix generator 312, a short-term spatial covariance matrix generator 313, a long-term spatial covariance matrix generator 314, an eigen divider 315, a per-subcarrier spatial covariance selector 316, and a beam weight selector 317.

The beam weight generator 310 finds the per-pilot spatial covariance matrix of each subcarrier given in Math FIG. 11 from the per-pilot channel matrix of each subcarrier through the per-pilot spatial covariance matrix generator 311.

The per-pilot spatial covariance matrix of each subcarrier is input to the per-subcarrier spatial covariance matrix generator 312, and a per-subcarrier temporal spatial covariance matrix is output by using Math FIG. 12.

In this instance, per-subcarrier spatial covariance matrix generates a short-term spatial covariance matrix according to Math FIG. 13 through the short-term spatial covariance matrix generator 313, and outputs a long-term spatial covariance matrix according to Math FIG. 14 through the long-term spatial covariance matrix generator 314.

When ρ is defined to be 0 in Math FIG. 12, a result of $R_{LT}(i)=R_{ST}(i)$ is given, and in this case, there is no need of separating long-term spatial covariance matrix and the short-term spatial covariance matrix.

The eigen divider 315 receives the long-term spatial covariance matrix, and outputs L eigenbeams according to Math FIG. 15.

Also, the per-subcarrier spatial covariance selector 316 outputs U per-subcarrier spatial covariance matrices allocated to the uplink of one user in the N per-channel spatial covariance matrices.

In this instance, the eigenbeam output by the eigen divider 315 and the per-subcarrier spatial covariance matrix output by the per-subcarrier spatial covariance selector 316 are input to the beam weight selector 317, and per-subcarrier beam weights $$W_1=[w_{11}, w_{12}, \ldots, w_{1U}]$$

311-1, $$W_2=[w_{21}, w_{22}, \ldots, w_{2U}]$$

311-2, and $$W_L=[w_{L1}, w_{L2}, \ldots, w_{LU}]$$

311-L are output according to Math FIG. 16.

Referring again to FIG. 2, the S/P converter 210 of the mobile station transmitter converts the channel-coded symbols which are input in series into U parallel signals, the signal repeater 220 repeats the U parallel signals by the number L of mobile station antennas, and the bean weight multiplier 230 multiplies beam weights by the outputs of the signal repeater.

Figure 4:
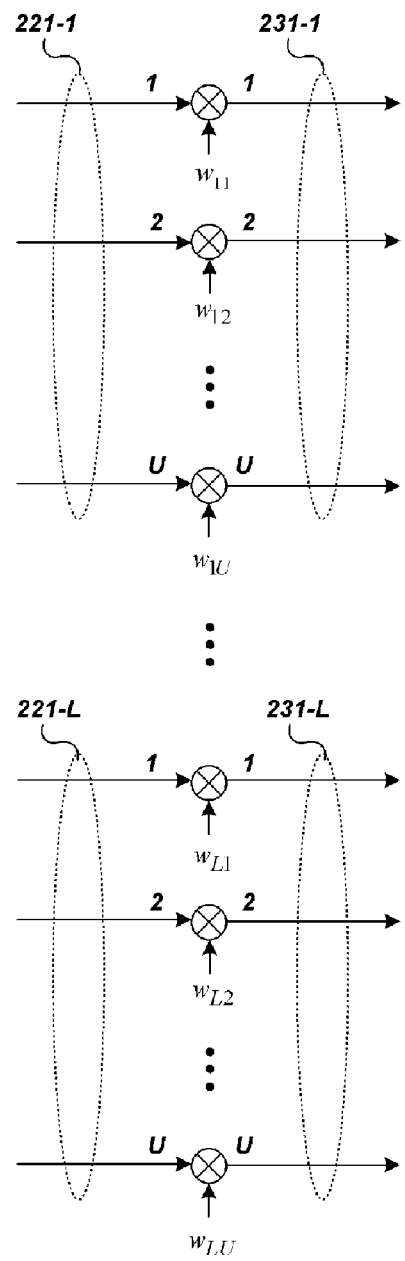
FIG. 4 shows a block diagram of a bean weight multiplier of a mobile station in an OFDM/TDD-based smart antenna system according to a preferred embodiment of the present invention.

FIG. 4 shows a block diagram of the beam weight multiplier of a mobile station in the OFDM/TDD-based smart antenna system according to the preferred embodiment of the present invention.

Referring to FIG. 4, in the beam weight multiplier, the respective IFFT converters 240-1 to 240-L receive U signals and generate one OFDM symbol, and OFDM symbols are transmitted through the base station antennas 250-1 to 250-L. As shown in FIG. 1, the transmitted OFDM symbols are received through the M base station antennas 140-1 to 140-M, and the respective M FFT units 160-1 to 160-M output the parallel signals 161-1 to 161-M.

The FFT-performed signals are input to the signal detector 170 the detected signals are converted into serial signals by the P/S converter 180 and the serial signals are output to be final result signals (i.e., decoded data) by the channel decoder 190.

According to the preferred embodiment of the present invention, the signals found by using the downlink signals are used to form beams in the uplink transmission, and errors may be generated by selecting the wrong eigenbeam when the coherent time is too short or long. The errors may have randomness but most of them are corrected by the channel decoder 190.

Accordingly, the fed-back state of information for forming beams through the downlink is eliminated by using the properties that the subcarriers of the OFDM/TDD system have spatial covariance and the TDD system has channel reciprocity, and the spatial covariance matrices for forming eigenbeams are found by using the pilots of downlink subcarriers.

While this invention has been described in connection with what is presently considered to be the most practical and preferred embodiment, it is to be understood that the invention is not limited to the disclosed embodiments, but, on the contrary, is intended to cover various modifications an equivalent arrangements included within the spirit and scope of the appended claims.

According to the present invention, complexity of the communication system is reduced by using the properties that the subcarriers of the OFDM system have spatial covariance and the TDD system has channel reciprocity, Also, no feedback device as required by the prior art is needed since the uplink spatial covariance is quickly found in the downlink by using the per-subcarrier spatial covariance matrix selector in the OFDM/TDD system.

Further, most errors which are randomly generated because of inaccurate selection of the optimal eigenbeams are restored by the channel decoder provided on the rear part of the receiver.

The invention claimed is:

1. A mobile station transmitter and receiver of a smart antenna system for forming uplink eigenbeams of the OFDM/TDD (orthogonal frequency division multiplex/time division duplex), comprising:

multiple antennas for transmitting OFDM symbols to a base station receiver, and receiving OFDM symbols from a base station transmitter;

a mobile station receiver for performing FFT (fast Fourier transform) on a predetermined number of OFDM symbols which are received through a corresponding number of the multiple antennas, outputting FFT-performed symbols as a corresponding number of sets of parallel signals, estimating channels from the sets of parallel signals, detecting signals from the sets of parallel signals using channel estimation results, converting the detected signals into serial signals, and outputting decoded serial signals; and a mobile station transmitter for converting channel-coded symbols which are input in series into a plurality of parallel signals, generating beam weights from channel matrices of respective pilot tones of each subcarrier according to the channel estimation results of the mobile station receiver, generating OFDM symbols with formed eigenbeams in accordance with the plurality of parallel signals and the beam weights, and outputting the OFDM symbols with formed eigenbeams, wherein the mobile station transmitter comprises a beam weight generator for generating the beam weights from the channel matrices of the respective pilot tones of each subcarrier according to the channel estimation results;

wherein the beam weight generator comprises:

a per-pilot spatial covariance matrix generator for receiving per-pilot channel matrices according to the channel estimation results, and generating per-pilot spatial covariance matrices of respective subcarriers;

a per-subcarrier spatial covariance matrix generator for using a predetermined number of pilot tones provided in a subcarrier, receiving the per-pilot spatial covariance matrices, and generating respective per-subcarrier spatial covariance matrices;

a short-term spatial covariance matrix generator for using a property that a plurality of downlink subcarriers provided to one user have the same spatial covariance matrix, receiving the respective per-subcarrier spatial covariance matrices, and generating short-term spatial covariance matrices;

a long-term spatial covariance matrix generator for receiving the short-term spatial covariance matrices, and outputting long-term spatial covariance matrices;

a per-subcarrier spatial covariance matrix selector for selecting uplink per-subcarrier spatial covariance matrices of subcarriers allocated to an uplink of the per-subcarrier spatial covariance matrix selector from the per-subcarrier spatial covariance matrices;

an eigen divider for receiving the long-term spatial covariance matrices, dividing the long-term spatial covariance matrices into respective eigenbeams, and outputting the eigenbeams; and a beam weight selector for receiving the divided eigenbeams and the uplink per-subcarrier spatial covariance matrices, and outputting per-subcarrier beam weights.

2. The mobile station transmitter and receiver of claim 1, wherein the mobile station transmitter comprises:

an S/P (serial/parallel) converter for converting the channel-coded symbols which are input in series into the plurality of parallel signals;

a signal repeater for repeating the parallel signals by the corresponding number of the multiple antennas;

a beam weight multiplier for respectively multiplying the beam weights generated by the beam weight generator by output of the signal repeater, and outputting multiplied results; and a plurality of IFFT (inverse fast Fourier transform) units each receiving the multiplied results output from the beam weight multiplier, generating a respective OFDM symbol with a formed eigenbeam, and outputting the respective OFDM symbol with the formed eigenbeam.

3. The mobile station transmitter and receiver of claim 1, wherein the short-term spatial covariance matrices correspond to the long-term spatial covariance matrices when a received packet is short.

4. The mobile station transmitter and receiver of claim 1, wherein an eigenbeam of the eigen divider is defined as an eigenvector which corresponds to a largest eigenvalue from among a plurality of eigenvectors, and is divided by the eigenbeam which maximizes a received power of the mobile station from among a plurality of eigenbeams.

5. The mobile station transmitter and receiver of claim 1, wherein the mobile station receiver comprises:

a plurality of FFT (fast Fourier transform) units for receiving the plurality of OFDM symbols through the multiple antennas, performing FFT on the OFDM symbols, and outputting the sets of parallel signals;

a channel estimator for estimating channels from the sets of parallel signals;

a signal detector for detecting signals from the sets of parallel signals using results of the channel estimator, and outputting the detected parallel signals;

a P/S (parallel/serial) converter for converting the detected parallel signals into the serial signals; and a channel decoder for decoding the serial signals, and outputting the decoded serial signals.

6. The mobile station transmitter and receiver of claim 5, wherein the channel estimator outputs channel matrices of the respective pilots tones of each subcarrier in order to calculate beamforming weights.

7. A mobile station transmitting and receiving method of a smart antenna system for forming uplink eigenbeams of the OFDM/TDD (orthogonal frequency division multiplex/time division duplex), comprising:

(a) receiving OFDM symbols from a base station transmitter through a downlink;

(b) performing FFT (fast Fourier transform) on a predetermined number of received OFDM symbols which are received through a corresponding number of antennas, outputting FFT-performed OFDM symbols as a corresponding number of sets of parallel signals, and estimating channels from the sets of parallel signals;
(c) detecting signals from the sets of parallel signals using channel estimation results;
(d) converting channel-coded symbols which are input in series into a plurality of parallel signals;
(e) generating beam weights from channel matrices of respective pilot tones of each subcarrier according to the channel estimation results; and
(f) forming eigenbeams according to the beam weights, generating OFDM symbols with formed eigenbeams, and transmitting the OFDM symbols to the base station receiver through the unlink;

wherein (b) comprises:
(i) receiving per-pilot channel matrices according to the channel estimation results, and generating per-pilot spatial covariance matrices of respective subcarriers;
(ii) using a predetermined number of pilot tones provided in a subcarrier, receiving the per-pilot spatial covariance matrices, and generating respective per-subcarrier spatial covariance matrices;
(iii) using a property that a plurality of downlink subcarriers have the sane spatial covariance matrix, receiving the respective per-subcarrier spatial covariance matrices, and generating short-term spatial covariance matrices;
(iv) receiving the short-term spatial covariance matrices and outputting long-term spatial covariance matrices;
(v) selecting uplink per-subcarrier spatial covariance matrices of subcarriers allocated to the uplink from among the per-subcarrier spatial covariance matrices;
(vi) receiving the long-term spatial covariance matrices, dividing the long-term spatial covariance matrices into respective eigenbeams, and outputting the eigenbeams; and
(vii) receiving the divided eigenbeams and the uplink per-subcarrier spatial covariance matrices, and outputting beam weights for the respective subcarriers.

8. The mobile station transmitting and receiving method of claim 7, wherein (i) comprises:
using the equation of $$R_{H_k}(n_k) = \tilde{H}_k^H(n_k)\tilde{H}_k(n_k)$$

and finding per-pilot spatial covariance matrices of respective subcarriers where $R_{H_k}(n_k)$ is the temporal spatial covariance matrix of the uplink MIMO channel matrix of $\tilde{H}_k(n_k)$ defined by using the $n_k^{th}$ pilot of the subcarrier k.

9. The mobile station transmitting and receiving method of claim 8, wherein (ii) comprises:
using $N_k$ pilots provided on a subcarrier and finding the spatial covariance matrix of the subcarrier k defined by the equation of $$R_{\tilde{H}_k} = \frac{1}{N_k} \sum_{n_k=1}^{N_k} R_{\tilde{H}_k}(n_k).$$

10. The mobile station transmitting and receiving method of claim 9, wherein (iii) comprises:
finding the short-term spatial covariance matrix $R_{ST}$ by using the equation of $$R_{ST} = \frac{1}{N} \sum_{k=1}^{N} R_{\tilde{H}_k}$$

since the downlink subcarriers provided to one user have the same spatial covariance matrix.

11. The mobile station transmitting and receiving method of claim 10 wherein (iv) comprises:
finding the long-term spatial covariance matrix $R_{LT}$ by using the equation of $$R_{LT}(i) = \rho R_{LT}(i-1) + (1-\rho) R_{ST}(i)$$

where i is a number of frames and p is a forgetting factor.

12. The mobile station transmitting and receiving method of claim 11, wherein (vi) comprises:
performing eigen division by using the equation of $$R_{LT} V = V\Theta$$

where $$\Theta = \text{diag}(\lambda_1, \lambda_2, \ldots, \lambda_L)$$

is a diagonal matrix having the eigenvalues of $$\lambda_1 \geq \lambda_2 \geq \ldots \geq \lambda_L$$

as elements, and it is given that $$V = [v_1\ v_2 \ldots v^L]$$

where $V_L$ is an eigenvector corresponding to $\lambda_L$.

13. The mobile station transmitting and receiving method of claim 12, wherein (vii) comprises:
using the subsequent equation and outputting beam weights for the respective subcarriers so that the eigenbeam for maximizing the received power of the base station of the subcarrier c may be the optimal beam of the u-th subcarrier from among U uplinks when the u-th subcarrier from among the U uplinks allocated to one user substantially corresponds to N subcarriers c, the equation being given as:

$$w_{u\_U} = \arg\max_{v_n, n=1,2,\ldots,L} \|\tilde{H}_c v_n\|^2$$
$$= \arg\max_{v_n, n=1,2,\ldots,L} v_n^H R_{\tilde{H}_c} v_n.$$

* * * * *